Feb. 18, 1958 C. W. GROSS 2,823,780
PORTABLE SKID TYPE CONVEYOR
Filed Feb. 21, 1956 3 Sheets-Sheet 2
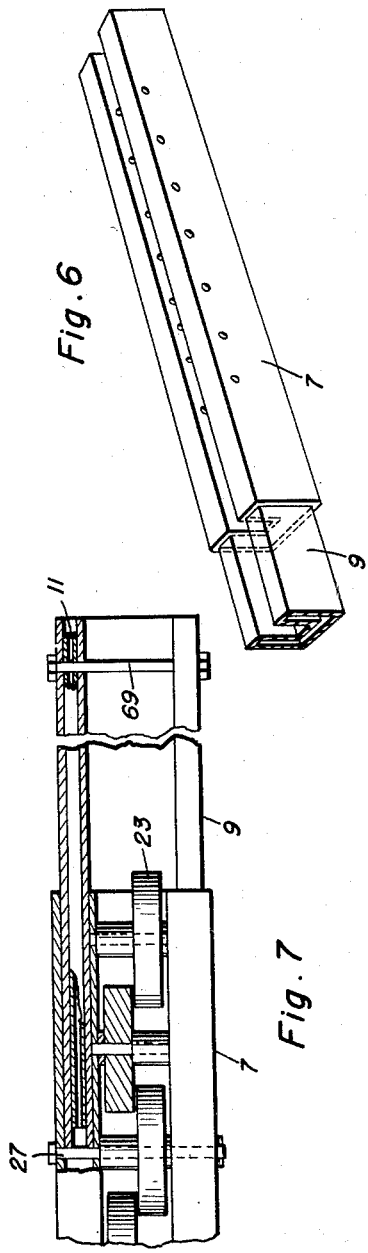
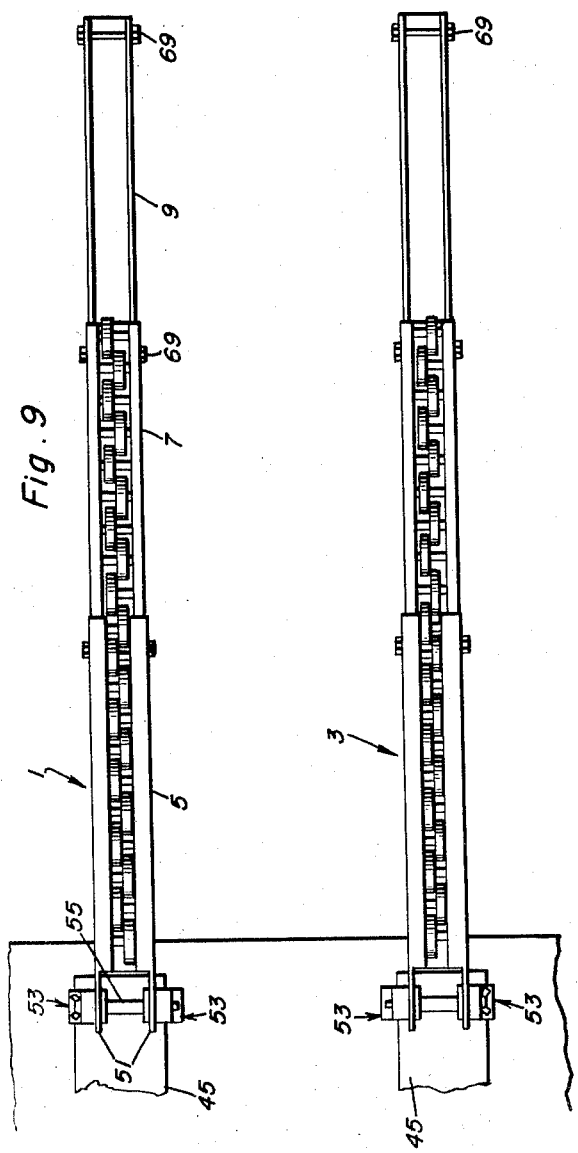
Calvin W. Gross
INVENTOR.
BY
Attorneys Feb. 18, 1958
C. W. GROSS
2,823,780
PORTABLE SKID TYPE CONVEYOR
Filed Feb. 21, 1956
3 Sheets-Sheet 3
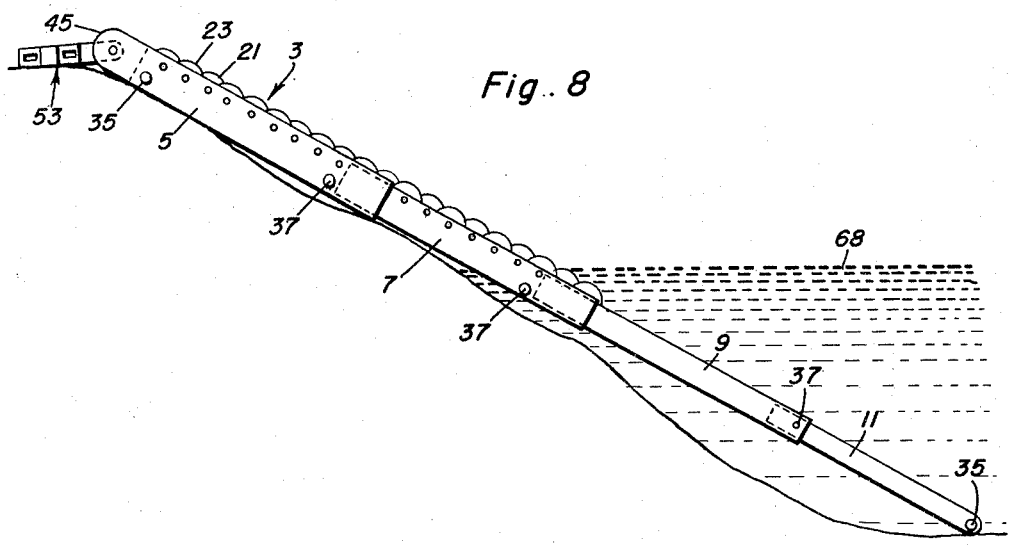
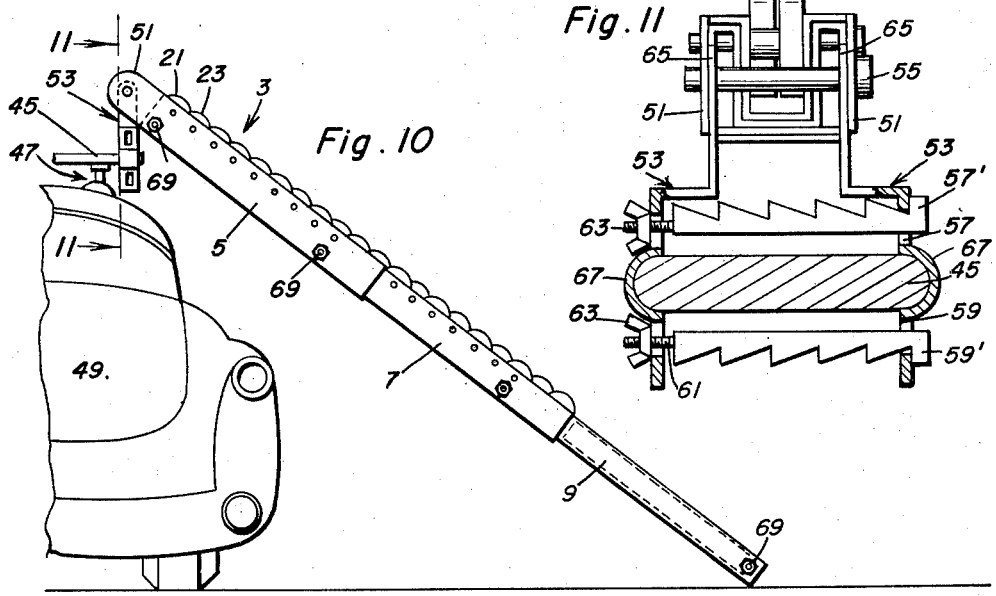
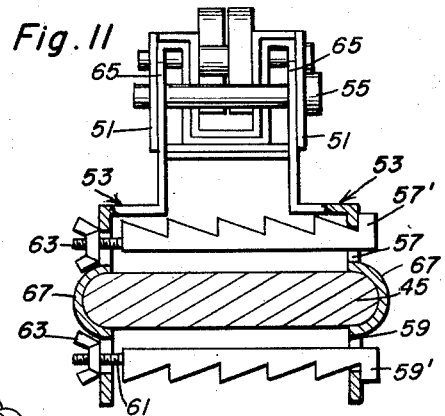
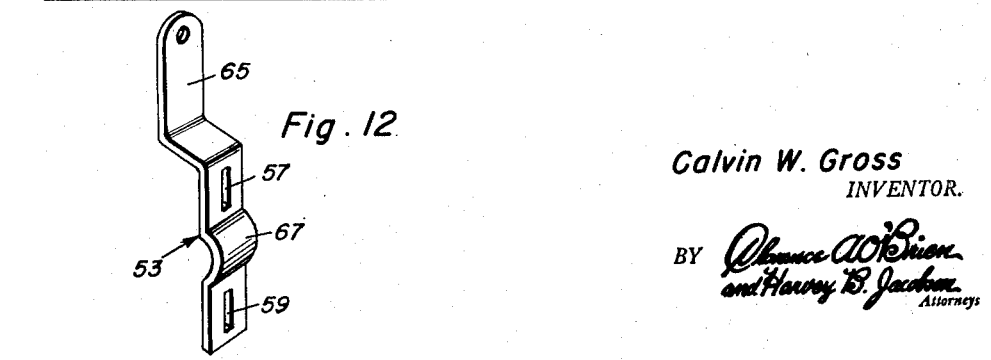
Calvin W. Gross
INVENTOR.
BY United States Patent Office 2,823,780
Patented Feb. 18, 1958

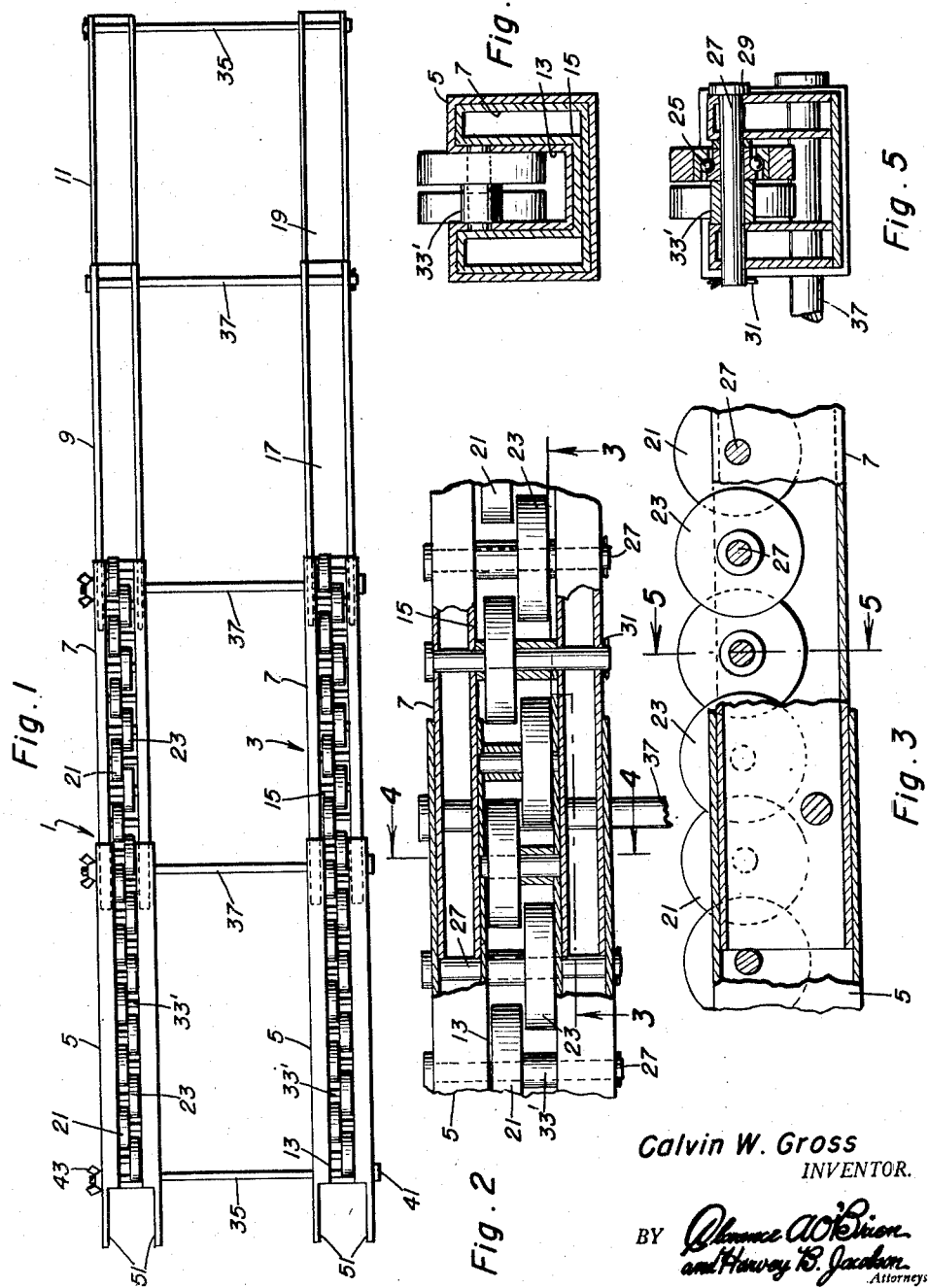

2,823,780

PORTABLE SKID TYPE CONVEYOR

Calvin W. Gross, Milwaukee, Wis.

Application February 21, 1956, Serial No. 566,913

2 Claims. (Cl. 193—41)

My invention relates to improvements in portable skid type conveyors for handling small boats and the like.

The primary object of my invention is to provide a readily portable skid type conveyor which will enable one man to unload small boats from the top luggage rack of an automobile or to load the same thereon and which is adapted for use as a ramp at the bank of a stream in lowering or raising such boats into or out of the water.

Another object is to provide a conveyor of the type and for the purposes above set forth which is extensible and contractile to lengthen or shorten the same as occasion may require and adapted to be easily taken apart for storage and carrying in a compact bundle in an automobile.

Still another object is to provide clamping means on the conveyor for easily and securely attaching the same to the luggage rack of an automobile top to incline downwardly to the ground at one side of the automobile for use in unloading a boat off the rack or loading a boat onto the rack.

Yet another object is to provide in such a conveyor a pair of extensible skids with means for rigidly connecting the same together for use in connected relation as a ramp for the purpose specified said means providing for disconnecting the skids to convert the conveyor for attachment of the skids to a luggage rack in separated relation so that an operator may walk between the same in unloading a boat from the rack or in loading a boat onto the rack.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a plan view of my improved conveyor with the skids attached;

Figure 2 is an enlarged fragmentary view in plan partly broken away and shown in section of a head and an intermediate section forming parts of each skid;

Figure 3 is a fragmentary view in longitudinal section taken on the line 3—3 of Figure 2;

Figure 4 is a view in transverse section taken on the line 4—4 of Figure 2;

Figure 5 is a view in transverse section taken on the line 5—5 of Figure 3;

Figure 6 is an enlarged fragmentary view in perspective of the head and the intermediate sections forming parts of each skid;

Figure 7 is an enlarged fragmentary view in plan partly broken away and partly shown in longitudinal section of one of the intermediate sections of each skid, a foot section telescoping into the intermediate section and an extension section for the foot section telescoping therein;

Figure 8 is a view in side elevation partly in section illustrating the use of the conveyor as a ramp at the bank of a stream;

Figure 9 is a view in plan of the skids detached from each other and attached to the luggage rack on an automobile top for use as a conveyor in unloading a boat from the top of an automobile or loading a boat thereon;

Figure 10 is a view illustrating one of the skids in side elevation attached to the luggage rack;

Figure 11 is an enlarged view in vertical transverse section taken on the line 11—11 of Figure 10 and illustrating in detail the clamping means; and Figure 12 is an enlarged perspective view of one of a pair of clamping bars of the clamping means.

Referring to the drawings by numerals the conveyor of my invention comprises a pair of elongated skids 1, 3 formed of telescopically connected metal sections there being in each skid a head section 5, an intermediate section 7 and a foot section 9 provided with an extension section 11.

The sections 5, 7, 9, 11 are tubular, of substantially rectangular cross section for strength and to prevent relative turning thereof and are relatively smaller in cross section successively in the order named to fit together successively and each extend from the preceding section, and each section 5, 7, 9, 11 is formed with a relatively narrow and shallow longitudinal central channel, or trough in its top and which are designated 13, 15, 17, 19 respectively the channel in each succeeding section straddling the channel in the preceding section as best shown in Figure 1. These channels 13, 15, 17, 19 reinforce the sections 5, 7, 9, 11 so that said sections may be formed of light weight thin gage metal.

The head and intermediate sections 5, 7 are each provided in the channels with two longitudinal rows of rollers 21, 23 extending above the sections and rotatably mounted on anti-friction bearings, as at 25, on cross spindles 27 in said sections having with the exceptions presently noted heads 29 on one end and cotter pins 31 on their other ends. The rollers 21, 23 are staggered on each row relative to those in the other row and overlap in the rows to form roller ways on the sections 5, 7. The rows of rollers 21, 23 are retained at opposite sides of the channels 13, 15 by spacing collars 33' on the spindles 27. As will be seen by reference to Figures 1, 2 and 4, the spindles 27 at the rear ends of the head and intermediate sections 5, 7 terminate at the sides of the channels 13, 15 so that the front ends of the sections 7, 9 are fitted in the rear ends of the sections 5, and 7 a limited distance in abutment with spindles 27 extending through the sections 5, 7.

The skids 1, 3 are detachably attached together in parallel spaced apart relation by terminal cross rods 35 at the ends of the skids and intermediate cross rods 37 connecting the sections 5, 7, 9, 11 in telescoped relation, said cross rods 35, 37 having heads 41 on one end and wing nuts 43 on their other ends.

Clamping means is provided on the front end of the head sections 5 for attaching the same to the end bars 45 of a luggage rack 47 on top of an automobile 49 and which comprises the following.

A pair of laterally spaced lugs 51 extend outwardly from the front end of each head section 5 at opposite sides thereof. Pairs of laterally spaced clamping bars 53 are pivotally secured at upper ends thereof between the lugs 51 by removable bolts 55. The pairs of clamping bars are adapted to be clamped against opposite sides of the end bars 45 to pivotally attach the skids 1, 3 to said bars 45 for vertical pivotal movement. For this purpose the clamping bars are provided with upper and lower aligned pairs of slots 57, 59 therein.

A pair of upper and lower toothed draw bars 57', 59' extend through the upper and lower slots of each pair of clamping bars 53 above and below the associated end bar 45 of the luggage rack. The toothed draw bars 57', 59' are adapted to hook at one end into the slots 57, 59 of one clamping bar 53, and are provided with reduced threaded shanks 61 on their outer ends extending through the slots 57, 59 on the front clamping bar 53 provided with wing nuts 63 thereon for tightening the draw bars 57', 59' to draw the clamping bars 53 into clamping relation in the pairs. As will be seen the slots 57, 59 and draw bars 57', 59' provide for varying the size of the clamps of which they form a part whereby to clamp against end bars 45 of different sizes. Preferably the upper ends 65 of said bars are inwardly offset to fit between the pairs of lugs 51 and are provided with central outwardly bowed bends 67 to fit opposite side edges of the end bars 45 of a luggage rack 47.

The described conveyor may be used with the skids 1, 3 attached to each other and with the sections 5, 7, 9, 11 extended as a ramp at the bank of a stream 68 to incline upwardly out of the stream and so that a boat, not shown, may be pushed up the rollers 21, 23 or eased downwardly on said rollers to elevate a boat out of a stream or lower it onto the same.

In using the conveyor to load a boat onto or off of the luggage rack 47 of the automobile 49 it may be converted by removing the cross rods 35, 37 and attaching the skids 1, 3 by means of the clamping bars 53 in separated relation as shown in Figures 9 and 10. This provides for attaching the conveyor to end bars 46 of the luggage racks 47 of different widths and for inclining the skids at different angles from said rack to the ground. When the cross rods, 35, 37 are removed the sections 5, 7, 9, 11 may be secured together by bolts 69 as shown in Figures 9 and 10. In any use of the conveyor the extension sections 11 may be retracted into the foot sections 9 and secured by bolts 69 as shown in Figures 7 and 10.

As will be apparent by removing the cross rods 35, 37, or the bolts 69, as the case may be, the skids 1, 3 may be detached from each other, the sections 5, 7, 9 may be detached, the extension sections 11 retracted into the foot sections 9 and said sections and rods and bolts together with the clamping bars 53 and the draw bars 57', 59' arranged in a compact bundle for storage or carrying in an automobile.

When the skids 1, 3 are attached in separated relation to a luggage rack as above described a boat may be easily pushed up the skids or eased down the skids by a person between the skids.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A conveyor comprising a pair of elongated skids each comprising telescopically connected square tube sections including a head section at one end of each skid, a foot section at the other end of each skid and an intermediate section between the head and foot sections, and means detachably connecting said skids together in laterally spaced parallel relation for use as a boat launching ramp when connected or for use when detached as separate side by side ramps for loading a boat onto an automobile top, said head and intermediate sections having telescoping longitudinal troughs therein spaced in each section from the sides of the section and each having a bottom one of which is spaced from the bottom of the telescopic section for sliding of the bottom of the telescopic section under the same, longitudinal parallel row of rollers in each trough with rollers in each row overlapping those in the other row, and spacers in said trough spacing the rollers from the sides of the trough and spacing the rows apart.

2. A conveyor as in claim 1, said head sections having secured thereto terminal pairs of clamping jaws for attachment to a luggage rack on top of an automobile.

References Cited in the file of this patent

UNITED STATES PATENTS

| 460,196 | Chase | Sept. 29, 1891 |
| 1,293,083 | Golding | Feb. 4, 1919 |
| 1,692,970 | Warnick | Nov. 27, 1928 |
| 2,172,378 | Harris | Sept. 12, 1939 |
| 2,611,466 | Biggert et al. | Sept. 23, 1952 |